United States Patent [19]

Inoue

[11] Patent Number: 4,856,649
[45] Date of Patent: Aug. 15, 1989

[54] DEOXIDIZER PARCEL
[75] Inventor: Yoshiaki Inoue, Tokyo, Japan
[73] Assignee: Mitsubishi Gas Chemical Company, Inc., Japan
[21] Appl. No.: 162,267
[22] Filed: Feb. 29, 1988
[30] Foreign Application Priority Data
  Mar. 2, 1987 [JP] Japan .................. 62-45162
[51] Int. Cl.⁴ .............................. B65D 81/26
[52] U.S. Cl. .................... 206/204; 206/484; 206/484.1; 428/36.6
[58] Field of Search ............... 428/318.4, 315.5, 304.4, 428/137, 138, 35; 156/77; 206/204, 484, 484.1, 484.2

[56] References Cited
U.S. PATENT DOCUMENTS

| | | | |
|---|---|---|---|
| 4,287,995 | 9/1981 | Moriya | 215/228 |
| 4,332,845 | 6/1982 | Nawata et al. | 428/35 |
| 4,399,161 | 8/1983 | Nakamura et al. | 426/541 |
| 4,421,235 | 12/1983 | Moriya | 206/524.2 |
| 4,485,133 | 11/1984 | Ohtsuka et al. | 428/35 |
| 4,487,791 | 12/1984 | Komatsu et al. | 428/35 |
| 4,579,223 | 4/1986 | Otsuka et al. | 206/204 |
| 4,657,133 | 4/1987 | Komatsu et al. | 206/484 |
| 4,667,814 | 5/1987 | Wakamatsu et al. | 206/0.7 |
| 4,724,961 | 2/1988 | Shimoyamada et al. | 206/484.1 |
| 4,769,175 | 9/1988 | Inoue | 206/484.1 |

FOREIGN PATENT DOCUMENTS 44-20879 9/1969 Japan .
60-37791 8/1985 Japan .

Primary Examiner—Willis Little
Attorney, Agent, or Firm—Leydig, Voit & Mayer

[57] ABSTRACT

A deoxidizer parcel has a sack-type parcel body and a deoxidizer contained in the parcel body. At least a part of the parcel body being made of a composite sheet which is composed of a gas-permeable sheet such as a sheet of paper or a non-woven cloth and a plastic film laminated on and bonded to the gas-permeable sheet. The plastic film has a multiplicity of minute pores formed by subjecting the plastic film already bonded to the gas-permeable sheet to an irradiation with a laser beam.

27 Claims, 1 Drawing Sheet

DEOXIDIZER PARCEL

BACKGROUND OF THE INVENTION

1. Field of the Invention

The present invention relates to a parcel of a deoxidizer and, more particularly, to a parcel which contains a deoxidizer for long preservation or package of goods such as foodstuffs, garments and drugs.

2. Description of the Related Art

In recent years, a method has been used widely for storing and preserving various goods such as foodstuffs, garments and drugs, by keeping such goods in a sealed system together with a deoxidizer which removes oxygen in the sealed system.

Usually, the deoxidizer in such a sealed system is contained in a small sack or parcel with gas-permeable wall. It is preferred that the material of the parcel enables the gas- or oxygen permeability to be adjusted as desired.

To comply with such a demand, various parcel materials have been proposed hitherto. For instance, Japanese Utility Model Post-Examination Publication No. 44-20879 discloses a laminated sheet material composed of a paper having a large gas-permeability and a polyethylene film having a multiplicity of tiny pores, the paper and the polyethylene film being heat-bonded together. On the other hand, Japanese Patent Post-Examination Publication No. 60-37791 discloses a laminated sheet material composed of two plastic films with tiny pores superposed on each other through the intermediary of a sheet of water-proof paper.

These known materials, which employ plastic films and paper sheets bonded together by heat and pressure, suffer from a common disadvantage in that the tiny pores in the plastic film are refilled or deformed by the heat and pressure applied during the bonding with the result that the gas-permeability of the sack fluctuates greatly. Another problem is that the laminated sheet materials exhibit only a small resistance to any force which acts to delaminate the plastic film and the paper sheet from each other.

SUMMARY OF THE INVENTION

Accordingly, an object of the present invention is to provide a deoxidizer parcel made of a laminated sheet material which experiences only a small fluctuation, if any, in the gas-permeability and which has an improved strength against any delaminating force.

To achieve this technical object, the present inventors made an intense study to reach a conclusion that a deoxidizer parcel, which enables an easy adjustment of gas-permeability and which has a large strength against delaminating force, can be obtained by using, as the sack material, a laminated sheet composed of a gas-permeable sheet and a plastic film bonded together, wherein, the plastic film is irradiated with a laser beam after the bonding so that only the plastic film is perforated.

Thus, according to the present invention, there is provided a deoxidizer parcel having a parcel body and a deoxidizer contained in the parcel body, at least a part of the parcel body being made of a composite sheet, the composite sheet comprising: a gas-permeable sheet; and a plastic film laminated on and bonded to the gas-permeable sheet and having a multiplicity of minute pores; the pores having been formed by subjecting the plastic film already bonded to the gas-permeable sheet to irradiation with a laser beam.

The gas-permeable sheet constitutes an essential portion of the material of the parcel of the present invention and is intended for providing a barrier which prevents the deoxidizer as the parcel contents from leaking and also prevents mixing of the deoxidizer with the contents of a sealed package such as foodstuffs. The gas-permeable sheet itself has a gas-permeability. A sheet of paper, non-woven cloth and so forth can suitably be used as the gas-permeable sheet. Examples of papers used suitably are wood-free paper, medium-wood-free paper, high- and medium-class-groundwood paper, gravure paper, art paper, coat paper, pure white machine-glazed paper, kraft paper, Japanese paper, board, paper with synthetic pulp, oil-proof processed paper, waterproof processed paper, and so forth. The non-woven cloth may be of dry-type, wet-type or spun-bond type, although a sheet of paper is preferably used. When a paper or a non-woven cloth is used as the gas-permeable sheet, the weight of such a paper or non-woven cloth preferably ranges between 10 and 400 $g/m^2$, preferably between 20 and 200 $g/m^2$.

The plastic film constituting an essential portion of the material of the parcel of the present invention is intended for a barrier which prevents mutual contact or mixing of the contents of the sealed package, e.g., foodstuffs, and the deoxidizer in the parcel, and also for providing a heat-sealability of the parcel material. The plastic film may be a single-layered film such as of polyethylene, ethylene-vinyl acetate copolymer and ethylene-acrylic ester copolymer, or a composite or laminated plastic film composed of a film having a low softening point and a film having a high softening point. Examples of the film having low softening point used in the composite plastic film are films of polyethylene, ethylene-vinyl acetate copolymer and ethylene-acrylic ester copolymer. Examples of the film having high softening point are a film of polyolefin such as polypropylene, film of polyamide such as nylon, and a film of polyester such as polyethylene terephthalate.

Although not exclusive, the plastic film used in the present invention preferably has a thickness not greater than $300\mu$ from a practical point of view. More preferably, the thickness ranges between 15 and $100\mu$. The plastic film used in the present invention may contain an inorganic or organic additive, in order to attain a high efficiency of absorption of the laser beam with which the plastic film is irradiated.

The laminated sheet composed of the gas-permeable sheet and the plastic film as specific above and bonded together will be referred to as "composite sheet", hereinunder. According to the invention, at least a part of the deoxidizer parcel is made of this composite sheet.

Various laminating methods can be adopted for forming the composite sheet, such as, for example, extrusion an lamination method, a wet lamination method and a dry lamination method, though the extrusion lamination method is preferably used.

When a laminated or composite plastic film is used as the plastic film in the material of the parcel of the present invention, it is preferred that the bonding between the composite plastic film and the gas-permeable sheet be conducted such that the surface of the composite plastic film having the lower softening point contacts the gas-permeable sheet.

The plastic film surface of the composite sheet composed of the plastic film and the gas-permeable sheet is then irradiated with a laser beam so that only the plastic film layer is perforated by the heat generated by the laser beam.

Thus, the irradiation with the laser beam is conducted for the purpose of perforating the plastic film layer, i.e., forming a multiplicity of tiny pores, only in the plastic film layer of the composite sheet.

The irradiation with the laser beam is conducted, for example, by directing a $CO_2$ laser beam of a power density ranging between $1 \times 10^{-2}$ and $1 \times 10^8$ W/cm$^2$ toward the plastic film surface of the composite sheet through a slit of a predetermined size, for a predetermined time which is typically $1 \times 10^{-7}$ to $1 \times 10^{-3}$ second, whereby the irradiated tiny spot absorbs the laser energy to generate heat by which the plastic film layer is molten to be perforated.

Examples of the laser beam suitably used in the production of the deoxidizer parcel of the invention are $CO_2$ laser beam, neodymium: YAG laser beam, neodymium: glass laser beam, ruby laser beam and alexandrite laser beam, though the $CO_2$ laser beam is used preferably.

The power density of the laser beam usually ranges between $1 \times 10^{-2}$ and $1 \times 10^8$ W/cm$^2$, though it preferably falls within the range of between $1 \times 10^{-1}$ and $1 \times 10^4$ W/cm$^2$. The irradiation time is preferably $1 \times 10^{-7}$ to $1 \times 10^{-3}$ second, preferably $1 \times 10^{-6}$ to $1 \times 10^{-4}$ second.

The size and number of the pores are selected such that the gas-permeability of the parcel material in terms of Gurley gas-permeability ranges between 1 and 50,000 sec/100 ml in$^2$, preferably between 1 and 5,000 sec/100 ml in$^2$. More practically, it is preferred that the pore size and number are selected to be not greater than 10 mm and not smaller than 100 pores/m$^2$, more preferably not greater than 1 mm and not smaller than 100 pores/m$^2$. The porosity of the plastic film, in terms of the total pore area per unit area, is not smaller than 0.08%, preferably not smaller than 0.2%.

According to the present invention, the composite sheet may be composed of three or more layers, e.g., a pair of plastic films laminated on both sides of a gas-permeable sheet. When the composite sheet has three layers as mentioned above, the plastic films may be of the same material as those mentioned before. It is, however, preferred that the inner plastic film has a softening point than that of the outer plastic film. The term "inner plastic film" means the plastic film which faces the interior of the deoxidizer parcel, while the term "outer plastic film" is used to mean the plastic film which faces the exterior of the deoxidizer parcel.

In a preferred form of the deoxidizer parcel of the invention employing plastic films on both sides of the gas-permeable sheet, the inner film which constitutes a heat-sealable surface of the parcel material is made of one of the single-layered plastic films mentioned before, while the outer film may be constituted by the composite or laminated plastic film mentioned before.

The composite sheet having two plastic films bonded on both sides of the gas-permeable sheet may be formed by any one of the laminating methods mentioned before. The perforation by irradiation with the laser beam also can be conducted in the same manner as that explained before. In this case, the laser beam may be applied to both sides of the composite sheet, independently or simultaneously, so as to form the pores in both plastic films.

Thus, the deoxidizer parcel of the present invention has a parcel body at least a part of which is made of a composite sheet with a plastic film layer having a multiplicity of pores formed therein by irradiation with a laser beam.

This deoxidizer parcel can be carried out in various ways an exemplarily shown below.

(1) A deoxidizer parcel having a parcel body constituted by a parcel material having a composite sheet composed of a single-layered plastic film and a gas-permeable sheet which are laminated and bonded together, only the plastic film of the composite sheet having been irradiated with a laser beam so that a multiplicity of pores are formed therein, the composite sheet being folded back such that the plastic film is positioned inside with the deoxidizing agent placed between two halves of the folded back composite sheet, edges of the folded sheet other than the edge of folding being heat-sealed.

(2) A deoxidizer parcel having a parcel body constituted by a parcel material having a composite sheet composed of a gas-permeable sheet, a single-layered plastic film on one side of the gas-permeable sheet, and a laminated plastic film placed on the other side of the gas-permeable sheet with the surface having lower softening point contacting the gas-permeable sheet, the single-layered plastic film, the gas-permeable sheet and the laminated plastic film being laminated and bonded together, only the single-layered plastic film and the laminated plastic film of the composite sheet having been irradiated with a laser beam so that a multiplicity of pores are formed therein, the composite sheet being folded back such that the single-layered plastic film is positioned inside with the deoxidizing agent placed between two halves of the folded back composite sheet, edges of the folded sheet other than the edge of folding being heat-sealed.

(3) A four-side-sealed deoxidizer parcel at least a portion of which is constituted by the parcel material set forth in item (1) above.

(4) A four-side-sealed deoxidizer parcel at least a portion of which is constituted by the parcel material set forth in item (2) above.

The deoxidizer parcel of the present invention usually has a rectangular form, though this form is not exclusive.

Various materials capable of absorbing oxygen can be used as the deoxidizer in the deoxidizer parcel of the present invention. Examples of such deoxidizers are materials which contains a ferrous sulfate salt such as ferrous sulfite, hydrogensulfite, or dithionite, and also substances such as hydroquinone, catechol, resorcin, pyrogallol, gallic acid, Rongalite, ascorbic acid and/or its salt, isoascorbic acid and/or its salt, sorbose, glucose, lignin, dibutyl hydroxytoluene and buthyl hydroxyanisole. The deoxidizer also may be a powdered agent containing a powdered metal such as iron.

A material containing ascorbic acid and/or its salt, a material containing isoascorbic acid and/or its salt and a material containing powdered metal are preferably used, among which material containing powdered metal is used most preferably. The invention, however, does not exclude other types of deoxidizer such as a carbon-dioxide generating deoxidizing composition and a carbon-dioxide absorbing deoxidizing composition.

The deoxidizer parcel in accordance with the present invention enables a free adjustment of the gas-permeability of the parcel material, and remarkably reduces the variation of the gas-permeability between different parcels.

DETAILED DESCRIPTION OF THE PREFERRED EMBODIMENTS

The invention will be fully understood from the following description of the preferred embodiments.

Figure 1:
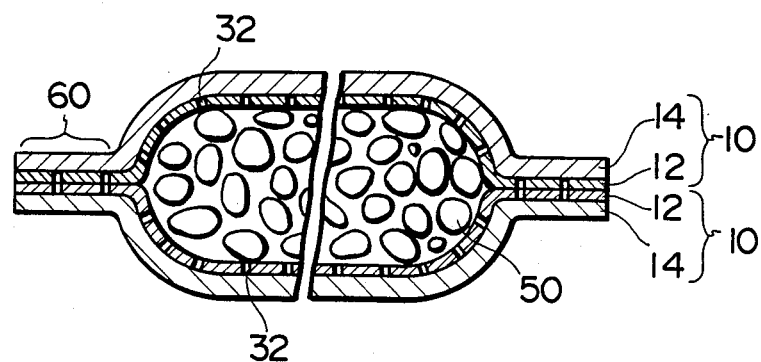
FIG. 1 is a cross-sectional view showing a deoxidizer parcel according to a first embodiment of the present invention.

Referring first to FIG. 1, a first embodiment of the deoxidizer parcel in accordance with the present invention has a parcel body made of a composite sheet 10 composed of a single-layered plastic film 12 and a gas-permeable sheet 14 which are laminated and bonded together. The composite sheet 10 has been subjected to irradiation with a laser beam only at its surface presented by the plastic film 12 so that minute pores 32 have been formed in the plastic film layer. A pair of composite sheets 10 thus prepared are superposed one on the other such that the plastic films of both composite sheets face each other, with a bulk of a deoxidizer 50 placed therebetween. Then, both composite sheets are heat-bonded at the edges around the bulk of deoxidizer 50 so as to seal the interior from the exterior, whereby a parcel containing a deoxidizer is obtained.

Figure 2:
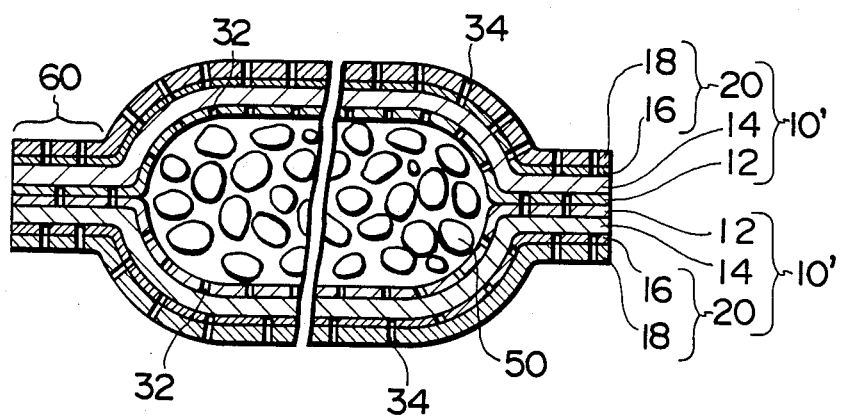
FIG. 2 is a cross-sectional view showing a deoxidizer parcel according to a second embodiment of the present invention.

FIG. 2 shows a second embodiment of the deoxidizer parcel of the present invention. This embodiment has a parcel body made of a composite sheet 10' which is composed of a gas-permeable sheet 14, a single-layered plastic film 12 on one side of the gas-permeable sheet 14, and a laminated plastic film 20 on the other side of the gas-permeable sheet 14, the single-layered plastic film 12, the gas-permeable sheet 14 and the laminated plastic film 20 being suitably laminated and bonded together. The laminated plastic film 20 is constituted by a plastic film 16 of a comparatively low softening point and a plastic film 18 of a comparatively high melting point. The laminated film 20 is bonded to the gas-permeable sheet 14 at the surface thereof presented by the plastic film 16 of the comparatively low softening point. The composite sheet has been subjected to irradiation with a laser beam at its both sides, so that minute pores 32 and 34 are formed in the single-layered plastic film 12 and the laminated plastic film 20, respectively.

A pair of the thus prepared composite sheets 10' are placed one on the other such that the single-layered plastic films 12 of both composite sheets face each other, with a bulk of a deoxidizer 50 placed therebetween. Then, both composite sheets are heat-bonded at their peripheral edges 60 thus heat-sealing the interior of the parcel.

The advantages of the present invention will be realized from the following description of Examples.

EXAMPLES 1-5

A composite sheet was prepared by laminating, through extrusion, a sheet of pure white machine-glazed paper having a basis weight of 60 g/m$^2$ and a low-density polyethylene film having a melting point of 105° C. and a thickness of 35$\mu$. The surface of the composite sheet presented by the polyethylene film was irradiated with a $CO_2$ laser beam of a power density of 10 W/cm$^2$ for a period of $1 \times 10^{-5}$ second, so that minute pores were formed only in the plastic film of the composite sheet. The thus processed composite sheet, as the material of the parcel body, was subjected to a test in which the gas-permeability in terms of Gurley-type permeability was measured in accordance with the measuring method as specified in the Japanese Industrial Standards (JIS) P-8117.

The parcel body material thus prepared was cut into a rectangular piece of 40 mm wide and 80 mm long, and the piece was folded back at its mid portion such that two halves of the sheet lie one on the other and such that the polyethylene film is placed inside, with a deoxidizer placed therebetween. The deoxidizer was an agent mainly consisting of powdered iron and having oxygen absorbability of 600 ml. Then, peripheral edges of the superposed two halves of the parcel body material were heat-sealed by 1-second heat pressing at 180° C. A plurality of parcels thus produced, with a variety of combinations of pore size and number, were subjected to a test for examining the deoxidizing time. The deoxidizing time was measured by placing the deoxidizer parcels in a sack of a composite material composed of KON (drawn nylon coated with polyvinylidene chloride, 15$\mu$ thick) and PE (polyethylene, 40$\mu$ thick) (referred to as KON/PE sack hereinafter), together with 0.5 l of air, preserving the KON/PE sack at 25° C., and measuring the time until the oxygen concentration in the KON/PE sack came down to 0.1%. The same measuring method for measuring the deoxidizing time is applied also to the following Examples and Comparison Examples.

The result of the measurement is shown in the following Table 1.

COMPARISON EXAMPLES 1-2

The parcel body material was prepared by bonding, by heating and pressing at 100° C. and 5 kg/cm$^2$, a pure white machine-glazed paper (basis weight 60 g/m$^2$) and a low-density polyethylene film (melting point 105° C., thickness 35$\mu$) perforated with needles. Parcels were produced by this parcel body material and were subjected to a test conducted under the same conditions as Examples 1-5. The results of the test on Comparison Examples 1-2 are shown in Table 1 together with the results of the test on Examples 1-5. In order to evaluate the tendencies of the fluctuation in the Gurley gas-permeability of the parcel body material and the deoxidizing time of the deoxidizer parcel, 10 pieces of sample parcels were used for each of Examples and Comparison Examples.

TABLE 1

| | Parcel material | | | Parcel |
|---|---|---|---|---|
| | Pore size (mm) | Pore number (Pores/m$^2$) | Gurley gas-permeability (*) | Deoxidizing time (Hrs) |
| Example No. 1 | 0.15 | 100 × 10$^3$ | 20-25 | 9-10 |
| Example No. 2 | 0.3 | 400 × 10$^3$ | 20-27 | 9-10 |
| Example No. 3 | 0.7 | 150 × 10$^3$ | 25-40 | 9-11 |
| Example No. 4 | 1.0 | 100 × 10$^3$ | 30-50 | 11-13 |
| Example No. 5 | 2.0 | 30 × 10$^3$ | 40-50 | 12-14 |
| Comparison Example No. 1 | (**) 0.15 | 1000 × 10$^3$ | 25-80 | 10-19 |
| Comparison Example No. 2 | 1.0 | 100 × 10$^3$ | 50-200 | 15-30 |

Note:
(*): Gurley gas-permeability shown in terms of sec/100 ml in$^2$
(**): Pore sizes in Comparison Examples 1-2 are mean values.

EXAMPLES 6-10

A composite sheet composed of low-density polyethylene film/pure white machine glazed paper/laminated plastic film was prepared by laminating a low-density polyethylene film having a melting point of 105° C. and a thickness of 35μ on one side of a sheet of pure white machine-glazed paper having a basis weight 60 g/m² and laminating also a laminated plastic film on the other side of the pure white machine-glazed paper. The laminated plastic film was composed of a polyethylene terephthalate film (15μ) and a low-density polyethylene film (melting point 105° C., thickness 20μ), and was placed such that the polyethylene film contacts the pure white machine glazed paper. The surface of the composite sheet presented by the polyethylene film was irradiated with a $CO_2$ laser beam of a power density of 10 W/cm² for a period of $1 \times 10^{-5}$ second, while the surface of the composite sheet presented by the polyethylene terephtalate film was irradiated with a $CO_2$ laser beam of a power density of 30 W/cm² for a period of $1 \times 10^{-5}$ second, so that minute pores were formed only in both plastic films of the composite sheet. The thus processed composite sheet, as the material of the parcel body, was subjected to a test in which the gas-permeability in terms of Gurley-type permeability was measured. A test also was conducted to examine the strength against delamination of the laminated plastic film from the pure white machine glazed paper. The measurement of the strength against delamination was measured by preparing a strip of 15 mm width of the parcel body material, partially exfoliating the laminated plastic film from the paper layer, pulling the partially exfoliated plastic film and the paper layer away from each other, and measuring the load required for completely separating both layers. This method of measuring delamination resistance is applied also to the following Examples and Comparison Examples.

The parcel body material thus prepared was cut into a rectangular piece of 40 mm wide and 80 mm long, and the piece was folded back at its mid portion such that two halves of the sheet lie one on the other and such that the polyethylene film is placed inside, with a deoxidizer placed therebetween. The deoxidizer was an agent mainly consisting of powdered iron and having oxygen absorbability of 600 ml. Then, peripheral edges of the superposed two halves of the parcel body material were heat-sealed by 1-second heat pressing at 200° C. A plurality of parcels thus produced, with a variety of combinations of pore size and number, were subjected to a test for examining the deoxidizing time.

The result of the test is shown in the following table 2.

COMPARISON EXAMPLES 3-4

The parcel body material was prepared by bonding, by heating and pressing at 110° C. and 5 kg/cm², a pure white machine-glazed paper (basis weight 60 g/m²), a low-density polyethylene film (melting point 105° C., thickness 35μ) placed on one side of the pure white machine glazed paper and perforated with needles, and a laminated plastic film composed of a polyethylene terephthalate film (15μ) and a low-density polyethylene film (melting point 105° C., thickness 20μ) placed on the other side of the pure white machine glazed paper such that the low-density polyethylene film contacts the paper layer and perforated by needles. Parcels were produced by this parcel body material and were subjected to a test conducted under the same conditions as Examples 6-10. The results of the test on Comparison Examples 3-4 are shown in the Table 1 together with the results of the test on Examples 1-5. In order to evaluate the tendencies of the fluctuation in the Gurley gas-permeability of the parcel body material and the deoxidizing time of the deoxidizer parcel, 10 pieces of sample parcels were used for each of Examples and Comparison Examples.

TABLE 2

| | Parcel material/state of pores | | | |
|---|---|---|---|---|
| | Polyethylene film | | Laminated plastic film | |
| | Pore size (mm) | Pore number (Pores/m²) | Pore size (mm) | Pore number (Pores/m²) |
| Example No. 6 | 0.15 | $1000 \times 10^3$ | 0.15 | $1000 \times 10^3$ |
| Example No. 7 | 0.15 | $1000 \times 10^3$ | 0.3 | $400 \times 10^3$ |
| Example No. 8 | 0.15 | $1000 \times 10^3$ | 0.7 | $150 \times 10^3$ |
| Example No. 9 | 0.15 | $1000 \times 10^3$ | 1.0 | $100 \times 10^3$ |
| Example No. 10 | 0.15 | $1000 \times 10^3$ | 2.0 | $30 \times 10^3$ |
| Comparison Example No. 3 | () 0.15 | $1000 \times 10^3$ | () 0.15 | $1000 \times 10^3$ |
| Comparison Example No. 4 | 0.15 | $1000 \times 10^3$ | 1.0 | $100 \times 10^3$ |

| | Parcel material | | Parcel De- |
|---|---|---|---|
| | Delamination resistance (g) (***) | Gurley gas-permeability (*) | oxidizing time (Hrs.) |
| Example No. 6 | | 40-50 | 12-14 |
| Example No. 7 | | 40-50 | 12-14 |
| Example No. 8 | | 50-70 | 12-15 |
| Example No. 9 | | 60-90 | 14-17 |
| Example No. 10 | | 80-100 | 14-18 |
| Comparison Example No. 3 | 55-100 | 50-200 | 12-13 |
| Comparison Example No. 4 | 55-100 | 100-450 | 18-50 |

Note
(*): Gurley gas-permeability shown in terms of sec/100 ml in².
(**): Pore sizes in Comparison Examples 3-4 are mean values.
(***): "Unmeasurable" means that delamination resistance could not be measured because of rupture of test piece due to too high delamination resistance.

As will be understood from the foregoing description, the deoxidizing agent parcel of the present invention has a parcel body made of a composite sheet composed of a gas-permeable sheet and a plastic film formed on at least one side of the gas-permeable sheet, the surface of the composite sheet presented by the plastic film having been subjected to irradiation with a laser beam so that a multiplicity of fine pores are provided only in the plastic film layer of the composite sheet. In consequence, the shape and size of the pores are uniform so as to suppress any tendency for the pore size and shape to fluctuate. In addition, a large delamination resistance is developed between the plastic film layer and the gas-permeable sheet. Thus, the present invention overcomes the problems of the known deoxidizer parcel made of a parcel material perforated by, for example, needles.

What is claimed is:
1. A deoxidizer parcel having a parcel body and a deoxidizer contained in said parcel body, at least a part of said parcel body being made of a composite sheet comprising:
   a gas-permeable sheet; and
   a plastic film laminated on and bonded to at least one surface of said gas-permeable sheet and having a multiplicity of uniform minute laser-formed pores, said pores formed after lamination and bonding of said plastic film to said gas-permeable sheet and having a gas-permeability of 1 to 50,000 sec/100 ml.

2. A deoxidizer parcel according to claim 1, wherein said gas-permeable sheet is made of a material selected from a group consisting of a sheet of paper and a non-woven cloth.

3. A deoxidizer parcel according to claim 1, wherein said gas-permeable sheet is made of a sheet of paper.

4. A deoxidizer parcel according to claim 2, wherein said material has a basis weight ranging between 10 and 400 g/m$^2$.

5. A deoxidizer parcel according to claim 1, wherein said plastic film is bonded only to one side of said gas-permeable sheet.

6. A deoxidizer parcel according to claim 5, wherein said plastic film on said parcel body faces the interior of said parcel.

7. A deoxidizer parcel according to claim 1, wherein said plastic film is a single-layered plastic film of a material selected from a group consisting of polyethylene, an ethylene-vinyl acetate copolymer and an ethylene-acrylic ester copolymer.

8. A deoxidizer parcel according to claim 1, wherein said plastic film is a laminated film composed of a plastic film having a comparatively low softening point and a plastic film having a comparatively high softening point.

9. A deoxidizer parcel according to claim 8, wherein said laminated plastic film is bonded to said gas-permeable sheet at the surface thereof presented by said plastic film having the comparatively low softening point.

10. A deoxidizer parcel according to claim 1, wherein said plastic film is provided on each side of said gas-permeable sheet.

11. A deoxidizer parcel according to claim 10, wherein the plastic film facing the interior of said parcel has a softening point lower than that of the plastic film which faces the exterior of said parcel.

12. A deoxidizer parcel according to claim 10, wherein the plastic film facing the interior of said parcel is made from a material selected from a group consisting of polyethylene, an ethylene-vinyl acetate copolymer and an ethylene-acrylic ester copolymer, while said plastic film facing the exterior of said parcel is a laminated plastic film composed of a plastic film having a comparatively low softening point and a plastic film having a comparatively high softening point.

13. A deoxidizer parcel according to claim 1, wherein said laser beam has a power density ranging between $1 \times 10^{-2}$ and $1 \times 10^8$ W/cm$^2$.

14. A deoxidizer parcel according to claim 13 wherein said plastic film is exposed to said radiation for $1 \times 10^{-7}$ to $1 \times 10^{-3}$ seconds.

15. A composite sheet having uniform porosity and high delamination resistance comprising:
a gas-permeable sheet; and
a plastic film laminated on and bonded to at least one surface of said gas-permeable sheet and having a multiplicity of uniform minute laser-formed pores, said pores formed after lamination and bonding of said plastic film to said gas-permeable sheet and having a gas-permeability of 1 to 50,000 sec/100 ml.

16. A composite sheet according to claim 15 wherein said gas-permeable sheet is made of a material selected from a group consisting of a sheet of paper and a non-woven cloth.

17. A composite sheet according to claim 16 wherein said material has a basis weight ranging between 10 and 400 g/m$^2$.

18. A composite sheet according to claim 15 wherein said plastic film is a single-layered plastic film of a material selected from a group consisting of polyethylene, an ethylene-vinyl acetate copolymer and an ethylene-acrylic ester copolymer.

19. A composite sheet according to claim 15 wherein said plastic film is a laminated film composed of a plastic film having a comparatively low softening point and a plastic film having a comparatively high softening point.

20. A composite sheet according to claim 19 wherein said laminated plastic film is bonded to said gas-permeable sheet at the surface presented by said plastic film having the comparatively low softening point.

21. A deoxidizer parcel as set forth in claim 1, wherein the number of said pores is 100 pores/m$^2$ and each of said pores has a diameter of 100 mm or less.

22. A composite sheet as set forth in claim 15, wherein the number of said pores is 100 pores/m$^2$ and each of said pores has a diameter of 100 mm or less.

23. A method of producing a gas-permeable composite sheet comprising the steps of:
laminating and bonding a plastic film on a gas-permeable sheet to form a composite sheet; and
irradiating said plastic film of said composite sheet with a laser beam to form minute pores to said plastic film.

24. A method of producing a gas-permeable composite sheet as set forth in claim 23, wherein said laser beam has a power density of $1 \times 10^{-2}$ to $1 \times 10^8$ W/cm$^2$ and is irradiated to said plastic film for $1 \times 10^{-7}$ to $1 \times 10^{-3}$ seconds.

25. A method of producing a gas-permeable composite sheet as set forth in claim 23, wherein said laser beam is selected from a group consisting of CO$_2$ laser beam, neodymium: YAG laser beam, neodymium: glass laser beam, ruby laser beam and alexandrite laser beam.

26. A method of producing a gas-permeable composite sheet as set forth in claim 23, wherein the number of said pores is 100 pores/m$^2$ and each of said pores has a diameter of 10 mm or less and the total area of said pores per unit area is 0.08% or more.

27. A method of producing a gas-permeable composite sheet as set forth in claim 23, wherein said plastic film has a thickness off 300$\mu$ or less.

* * * * *